(12) United States Patent
Wilmer et al.

(10) Patent No.: US 11,761,740 B1
(45) Date of Patent: Sep. 19, 2023

(54) SYSTEM AND METHOD FOR DISABLING MULTI-ROTOR AIRCRAFT

(71) Applicant: Government of the United States, as represented by the Secretary of the Air Force, Wright-Patterson AFB, OH (US)

(72) Inventors: Adam Wilmer, Cape Coral, FL (US); Derrick Jochmans, Panama City, FL (US); Matthew Fleckenstein, New Lenox, IL (US); James Westfall, Colorado Springs, CO (US); James Roberts, Waunakee, WI (US); Nicholas Pingel, Colorado Springs, CO (US); Michael Anderson, Colorado Springs, CO (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 67 days.

(21) Appl. No.: 17/409,905

(22) Filed: Aug. 24, 2021

Related U.S. Application Data

(60) Provisional application No. 63/086,119, filed on Oct. 1, 2020.

(51) Int. Cl.
| | | |
|---|---|---|
| *F42B 12/60* | (2006.01) | |
| *F41H 11/04* | (2006.01) | |
| *B64D 1/06* | (2006.01) | |

(52) U.S. Cl.
CPC .............. *F42B 12/60* (2013.01); *F41H 11/04* (2013.01); *B64D 1/06* (2013.01)

(58) Field of Classification Search
CPC .... F41H 13/0006; F41H 13/00; B64C 39/024
USPC ......................................................... 102/504
See application file for complete search history.

(56) References Cited

U.S. PATENT DOCUMENTS

| | | | |
|---|---|---|---|
| 8,783,607 B2 | 7/2014 | Allen | |
| 9,175,934 B1 | 11/2015 | Kilian | |
| 10,401,129 B2 | 9/2019 | Armstrong et al. | |
| 10,435,153 B2 | 10/2019 | Klein | |
| 2017/0261292 A1* | 9/2017 | Armstrong | F41H 11/02 |
| 2018/0245888 A1* | 8/2018 | Banga | F41H 11/04 |
| 2019/0285388 A1* | 9/2019 | Klar | F41G 9/002 |
| 2020/0108925 A1* | 4/2020 | Smith | B64C 39/024 |

* cited by examiner

*Primary Examiner* — John Cooper
(74) *Attorney, Agent, or Firm* — AFMCLO/JAZ; Matthew D. Fair

(57) ABSTRACT

A drone disabling device includes a plurality of streamer launch tubes having at least one streamer device positioned therein. A barrel housing is configured to hold the plurality of launch tubes within streamer launch barrels. An ignition system is configured to ignite propellant within the launch tubes and launch the streamer devices from the barrel housing such that one or more propellers of a hostile drone will become entangled and disabled. A parachute connected to the streamer device is deployed as the drone descends to protect people and property on the ground and to preserve the drone for intelligence gathering after landing.

20 Claims, 6 Drawing Sheets

SYSTEM AND METHOD FOR DISABLING MULTI-ROTOR AIRCRAFT

Pursuant to 37 C.F.R. § 1.78(a)(4), this application claims the benefit of and priority to prior filed Provisional Application Ser. No. 63/086,119, filed Oct. 1, 2020 which is expressly incorporated herein by reference.

RIGHTS OF THE GOVERNMENT

The invention described herein may be manufactured and used by or for the Government of the United States for all governmental purposes without the payment of any royalty.

TECHNICAL FIELD

The present disclosure generally relates to a method and apparatus for disabling multi-rotor aircraft and more particularly, but not exclusively to using non lethal means to disable and capture the multi-rotor aircraft.

BACKGROUND

Multi-Rotor aircraft commonly known as drones can provide reconnaissance capabilities and lethal force in some applications. With the proliferation and lowering cost of autonomous drone technology, military and civil protection organizations are increasingly concerned that this technology will be used to attack "soft" targets. There is increasing demand for technologies and methods to identify, track and engage such hostile aircraft. In some instances, it is desirable for the mitigation approach to be kinetic in nature as opposed to Radio Frequency (RF) jamming or spoofing. The present invention advantageously provides means to defend against hostile drones by including increased capability over prior art drone disabling devices.

SUMMARY

One embodiment of the present disclosure includes a unique apparatus and method for disabling a multi-rotor aircraft (e.g. drone). Other embodiments include apparatuses, systems, devices, hardware, methods, and combinations wherein a disabling device launches one or more streamers from launch tubes at altitude, which entangle a rotor and disables one or more hostile aircraft. A parachute will deploy to safely land the hostile aircraft. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
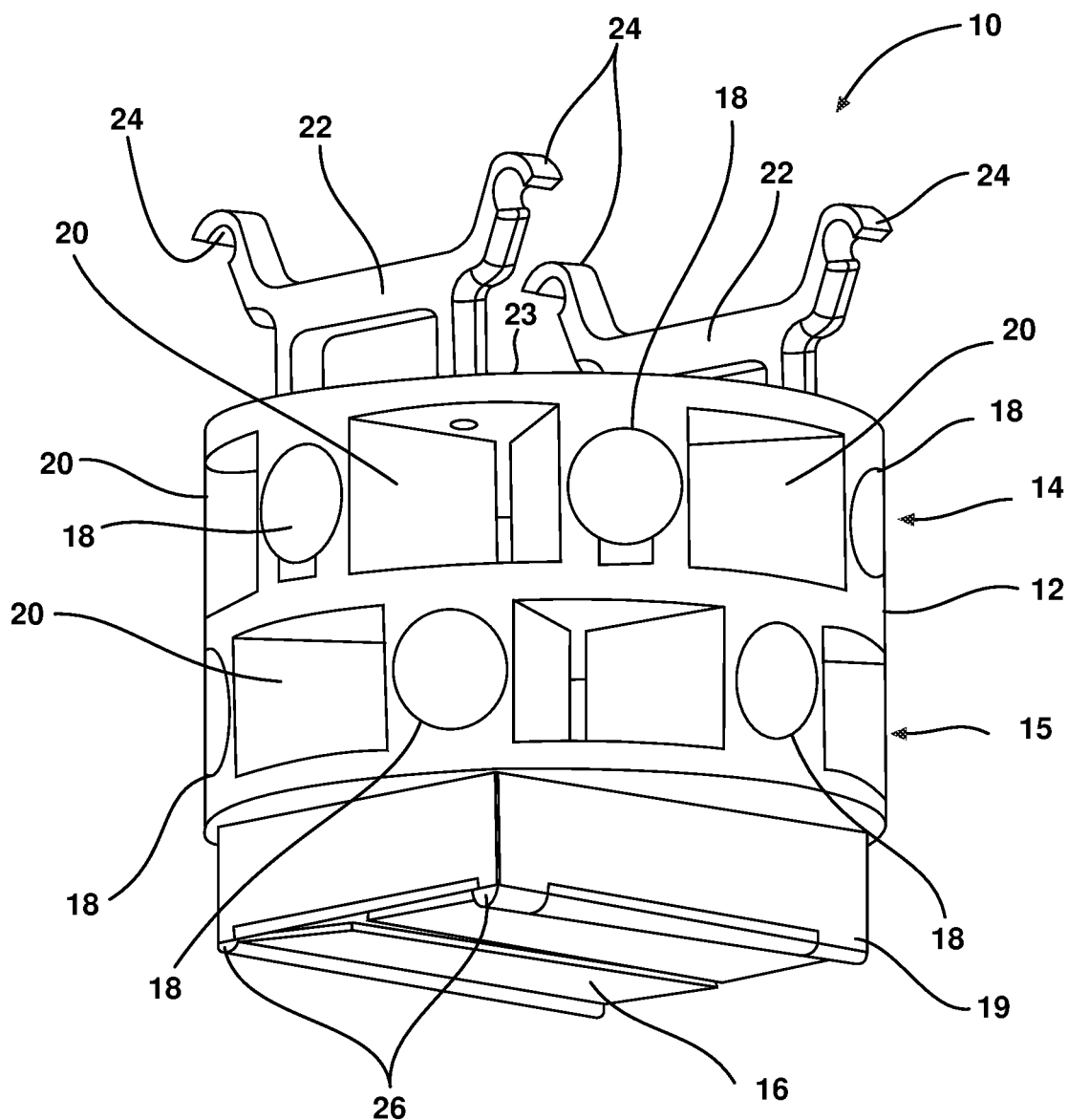
FIG. 1 is a perspective view of a streamer launch barrel according to one embodiment of the present disclosure.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present disclosure provides an apparatus, system and method for disabling and safely recovering multi-rotor aircraft (e.g. drones.) A disabling device provides a kinetic capability for defending against the threat of hostile multi-rotor aircraft such as "quadrotor" drones and similar Small Unmanned Aerial Systems (SUAS). The disabling device can disable one or more drones flying in the vicinity thereof. The disabling device projects a 360 degree "streamer cloud" which permits disabling hostile drones located at any position around the disabling device. The system further has the capability to disable a hostile drone in a non-destructive manner and bring it to the ground in a controlled manner, so as not to harm innocent bystanders and preserve the ability to collect forensic information for intelligence gathering.

The disabling device can be placed in service with a friendly, or "blue-force" multi-rotor drone. A novel multi-barrel cannon system carried by the blue force drone launches one or more prop-fouling streamers with attached parachutes that operate to disable the hostile drone and lower it safely to the ground. During an engagement, the blue-force pilot and/or autopilot system will maneuver the blue force drone into a desired position relative to the hostile drone. Typically, the blue force drone will launch the streamers just above a hostile drone, however the disabling device can be triggered in any area where a hostile drone is expected to fly. Upon triggering the cannon system, streamers launch out of one or more barrels, in the flight path of the hostile drone. One or more of the streamers will entangle in one or more of the propellers (props) of the hostile drone, bringing the prop(s) to a stop and cause the drone to lose lift and stability. Parachutes attached to the streamers will then slow the rate of descent of the hostile drone to the ground so that the hostile drone can be recovered and analyzed.

The disabling device is defined by a main barrel housing that includes a plurality of independent barrels. Each barrel can be fired independently or in unison to create a defensive curtain effect. Each barrel holds a launch tube that houses one or more prop-fouling streamers specifically designed to entangle in the propellers of a hostile drone. The system includes a central cord, one or more aerodynamic streamers, a counterweight, a parachute, solid propellant and an ignition system.

Figure 2:
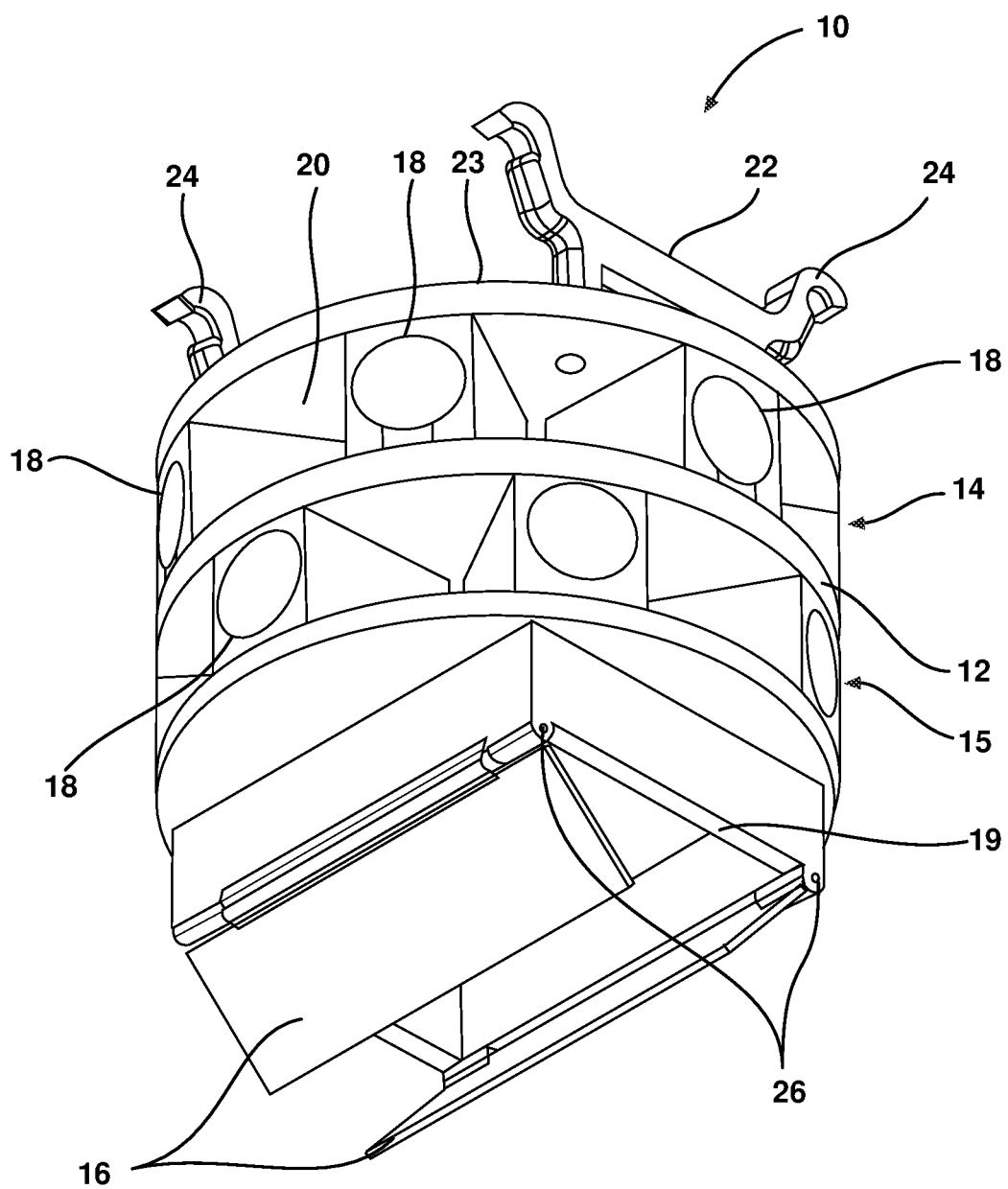
FIG. 2 is another perspective view of the streamer launch barrel with bomb bay doors open.
Figure 3:
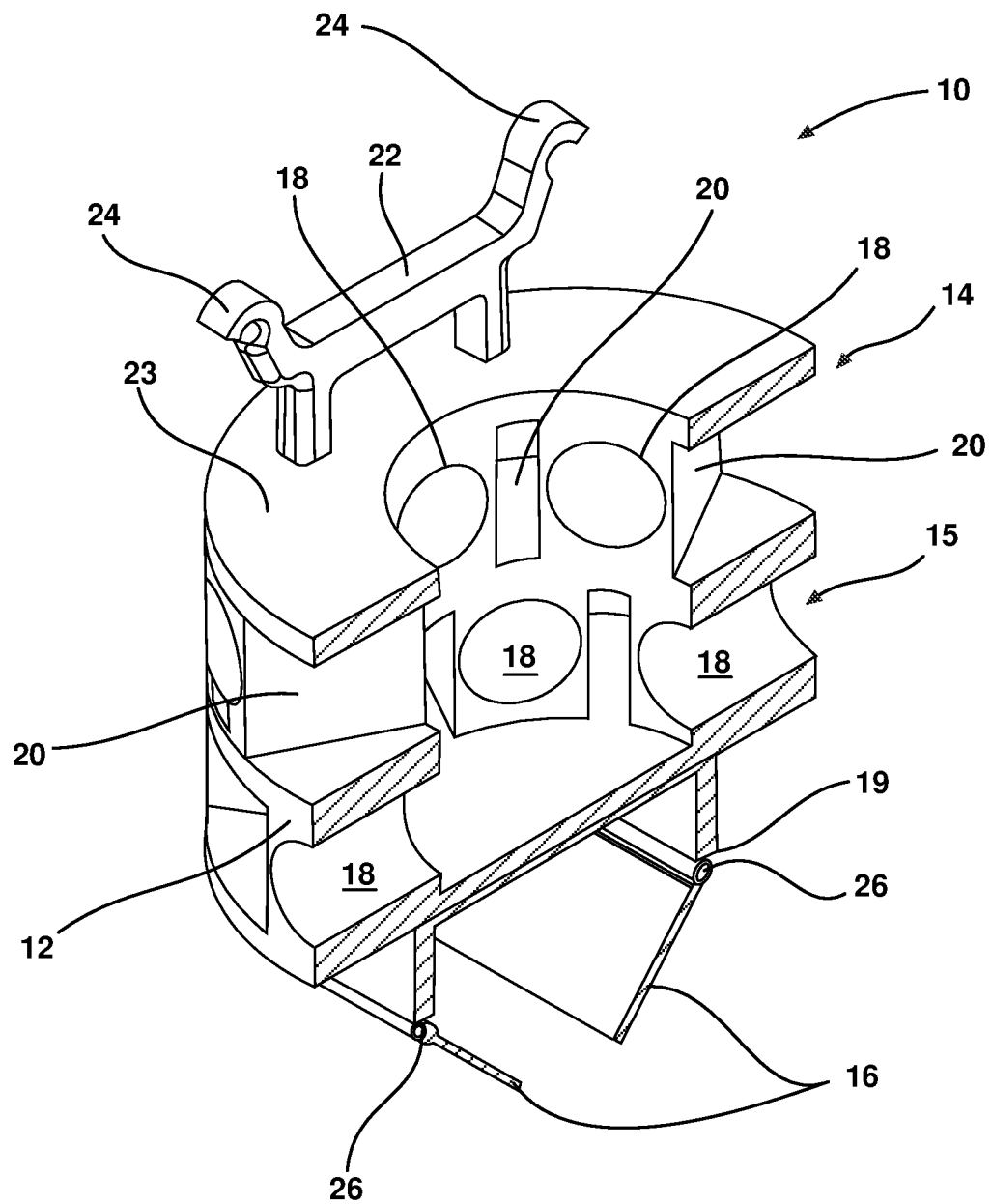
FIG. 3 is a cutaway perspective view of the streamer launch barrel.

Referring generally now to FIGS. 1-3, a Prop-Fouling Array Cannon (PAC) System defining a drone disabling device 10 is shown in various perspective views. The disabling device 10 includes a barrel housing 12 with a first rosette 14 and a second rosette 15 having a plurality of barrels 18 formed around a perimeter thereof. In other forms, the disabling device 10 may have additional rosettes to increase the number of barrels 18 in the barrel housing 12. A bomb bay 16 can be positioned proximate a bottom side 19 of the barrel housing 12. An exhaust port 20 is coupled with each barrel 18 on an opposing side of the barrel housing 12. At least one hanger 22 extends from a top side 23 of the barrel housing 12 to provide a connection for an aircraft such as a multi-rotor drone to carry the device 10. The disclosed embodiment shows two hangers 22, however it should be understood that additional hangers 22 or other types of connections may be employed to carry the disabling device 10 to a desired altitude conducive for disabling hostile multi-rotor aircraft. Each hanger 22 may include a hook 24 formed at the ends thereof to facilitate a connection to a host aircraft (not shown). The bomb bay doors 16 include hinges 26 that permit opening and closing with an actuator or electric motor (not shown). FIG. 1 shows the bomb bay doors 16 closed and FIG. 2 shows the bomb bay doors 16 open.

Figure 4:
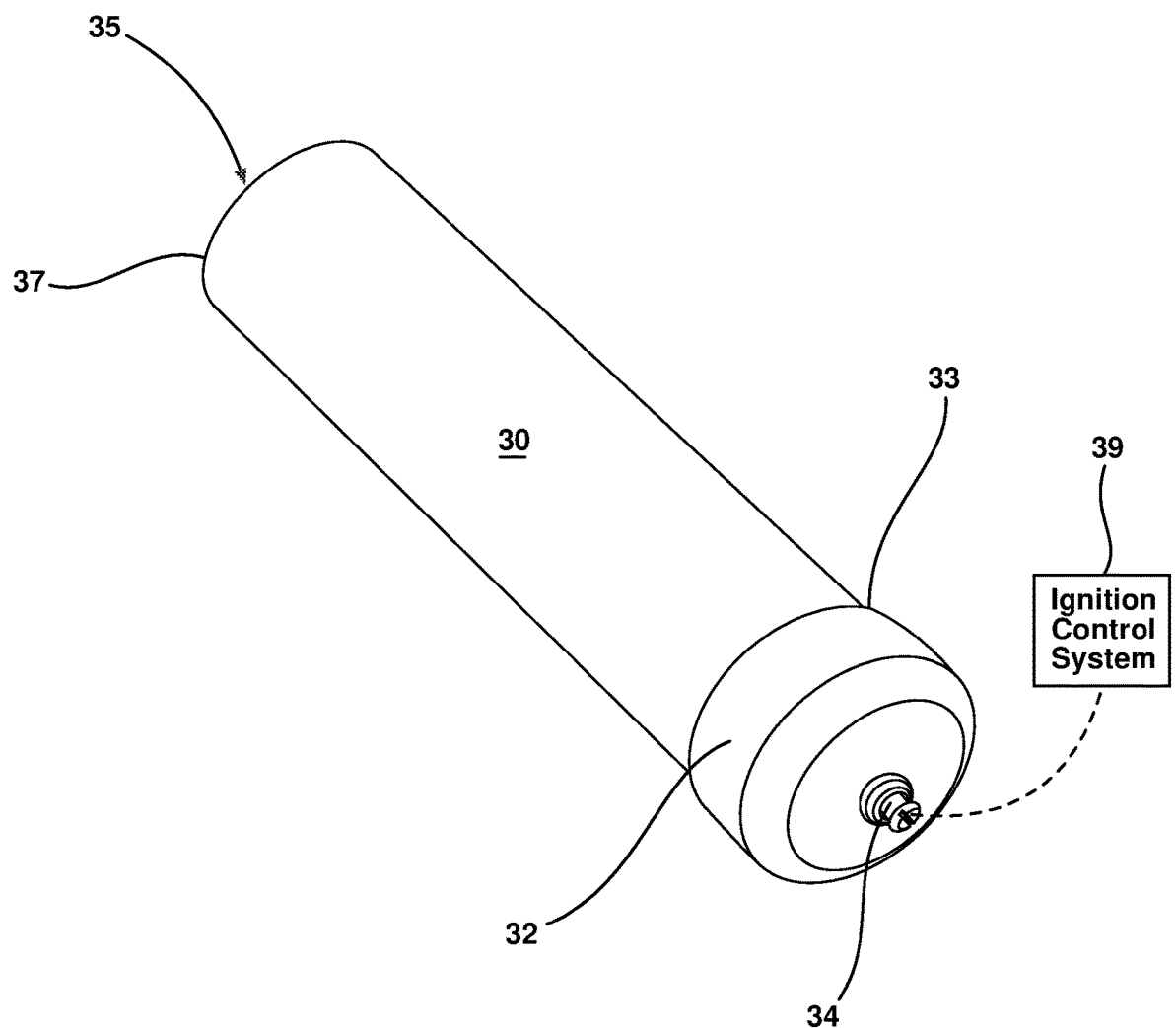
FIG. 4 is a perspective view of a streamer launch tube.

Referring now to FIG. 4, a perspective view of a launch tube 30 sized to fit within a barrel 18 of the barrel housing 12 is illustrated. The launch tube 30 includes an end cap 32 positioned at a first end 33 to enclose the contents internal to the tube 30. An outlet 35 is defined at the second end 37 opposite of the first end 33 of the tube 30. A glow plug 34 can be connected to the end cap 32 to ignite a combustible propellant such as gunpowder, rocket fuel or other types of propellant known to those skilled in the art. An ignition and control system 39 is used to provide power to the glow plug 34 as would be known to those skilled in the art. It should be understood that other types of ignition systems and locations may be utilized and not depart from the teachings of the present disclosure. By way of example and not limitation, other ignition sources such as a spark plug or other incendiary devices may be used. Further, the ignition source may be located at locations other than the tip of the end cap 32. The ignition and control system 39 can include a central processing unit (CPU), input/output systems to receive and transmit signals to/from a remote location, a power supply and an actuator system to operate the bomb bay doors 16.

Figure 5:
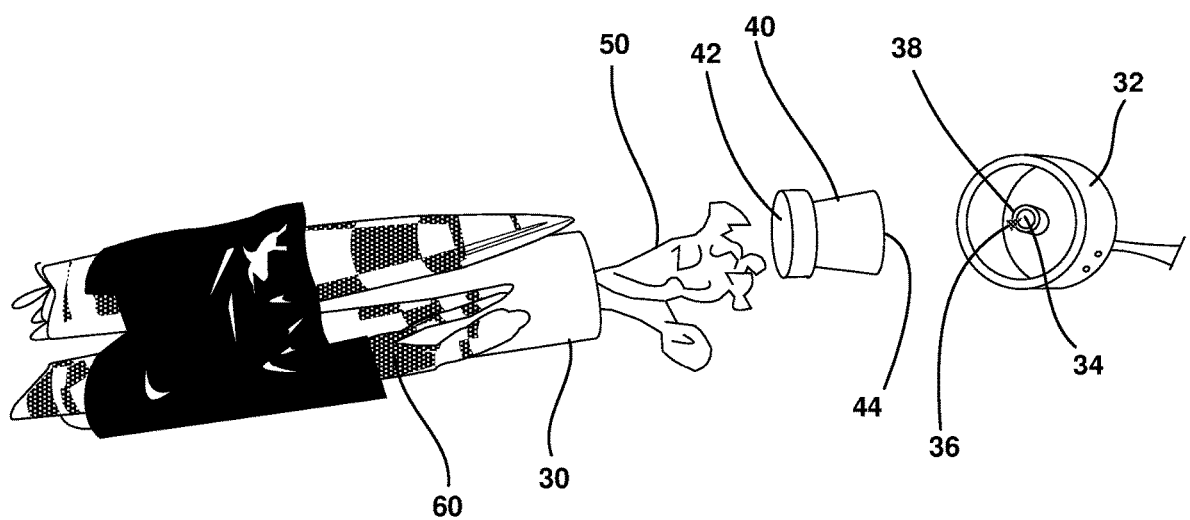
FIG. 5 is an exploded view of components positioned in a streamer launch tube.

Referring to FIG. 5, an exploded view of components positioned in a streamer launch tube 30 is illustrated. The end cap 32 can include a glow plug 34 extending through an endwall of the end cap 32. A sleeve 38 can be positioned around the glow plug 34 and is sized to hold a predetermined amount of propellant 36. In one form, the sleeve 38 is cylindrical, however other shapes are contemplated by the teachings herein. A shuttlecock 40 is positioned adjacent to the glow plug 34. The shuttlecock 40 includes a head 42 at one end with a cone 44 extending therefrom toward the opposite end. The cone 44 is disposed over the sleeve 38 and is operable to receive the blast force of the combusted propellant 36 and provide a motive force to push the contents of the launch tube 30 through the outlet end 35. The head 42 of the shuttlecock 40 will ram into the components in the launch tube 30 to cause ejection through the outlet 35. In other forms, the system may not include a shuttlecock or may include a different type of device to receive the explosive force of the combustion products and push the components from the launch tube 30.

A fire retardant material 50 can be positioned adjacent the head 42 of the shuttlecock 40 so that any hot gases that escape past the shuttlecock 40 can be absorbed without causing damage to any of the components of the rotor disabling system. A parachute 60 can be attached to the launch tube 30 on the outer perimeter wall.

Figure 6:
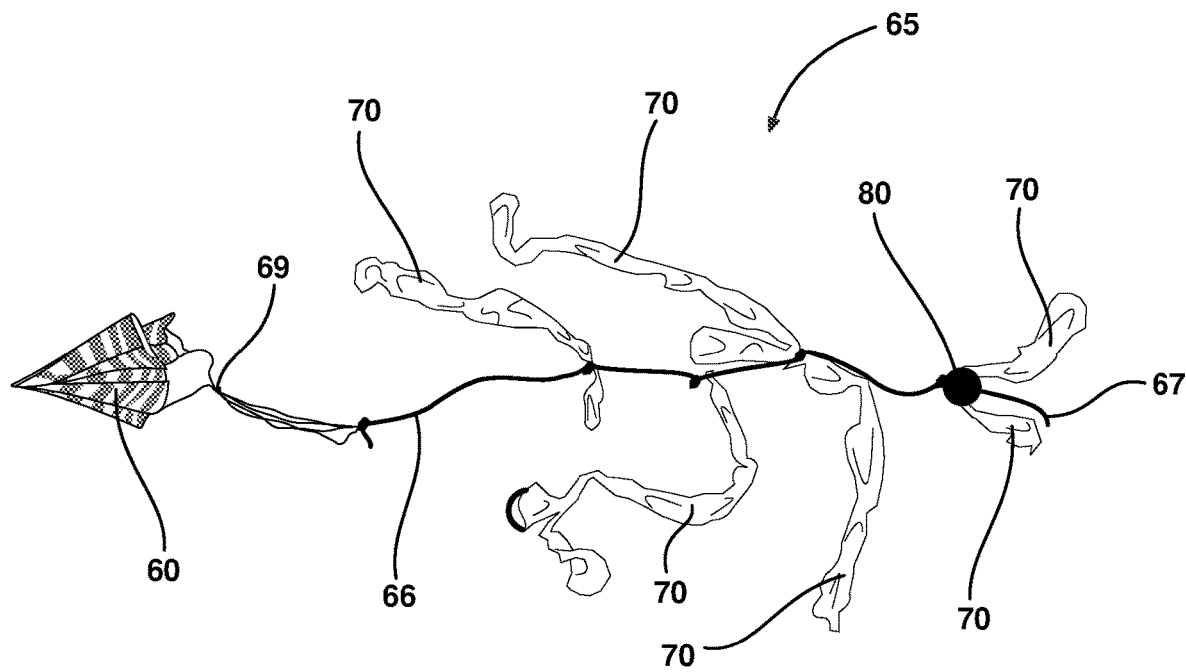
FIG. 6 is a view of a streamer device that can be deployed from a streamer launch tube.

Referring to FIG. 6, a streamer device 65 is positioned within the launch tube 30 and ejected through the outlet end 37 after the propellant 36 is ignited. The streamer device 65 includes a cord 66 such as a string, rope, cable or other similar construction extending between a first end 67 and a second end 69. A plurality of streamer elements 70 are positioned intermittently along a length of the cord 66 between the first and second ends 67, 69. The streamer elements 70 can be made from any material that will wrap around a rotor after becoming entangled around the propeller of a hostile drone. In one form, the streamer elements 70 can be made from a polyethylene strip material, however the invention is not limited as such. The parachute is attached to the cord 66 proximate the second end 69. A weight 80 can be attached to the cord 66 proximate the first end 67 thereof. The weight will ensure that the parachute is oriented in an upright position during descent so that it opens and operates to slow the speed of descent of the hostile drone after it becomes inoperable due to entanglement of one or more streamer elements 70.

In some embodiments, multiple streamer devices 65 may be launched from a single launch tube 30. In other embodiments, a streamer device may include multiple cords 66 with streamer elements 70 attached to a single parachute 60. The control and ignition system 39 (see FIG. 4) can be programmed to launch all of the streamer devices 65 from all of the launch tubes 30 in the barrel housing 12 simultaneously. Alternatively, the control and ignition system 39 can be programmed to launch a plurality of streamer devices 65 or a single streamer device 65 independently.

In one aspect the present disclosure includes an apparatus comprising: a barrel housing having a plurality of barrels formed around a perimeter thereof; a connecting feature formed on a top side thereof; and a bomb bay door formed on a bottom side thereof.

In refining aspects, the connecting feature includes a pair of hangers attachable to a host aircraft; the apparatus further includes a streamer launch tube positioned within at least one of the barrels of the barrel housing; at least one streamer device positioned within the streamer launch tube; at least one streamer element extending from a cord of the streamer device; a propellant disposed within the streamer launch tube; an ignition and control system operable for igniting the propellant and launching the at least one streamer device; a parachute connected to each of the streamer devices; wherein a plurality of launch tubes are configured to launch a plurality of streamer devices independently or simultaneously; and wherein the bomb bay door is configured to eject at least one streamer device therethrough.

In another aspect, a drone disabling device comprises: a barrel housing having a plurality of barrels; a streamer launch tube positioned in at least one of the plurality of barrels; at least one streamer device with a plurality of streamer elements positioned within each streamer launch tube; a propellant loaded into the at least one launch tube sufficient to propel the streamer device from the barrel; and an ignition system configured to ignite the propellant and launch the streamer device from the barrel.

In refining aspects, the barrel housing includes a bomb bay door configured to permit launching of at least one streamer device therethrough; the drone disabling device further comprises a parachute connected to each streamer device; a cord connected to the parachute, the plurality of streamer elements and a weight; wherein the ignition system includes a glow plug to initiate combustion of the propellant; further comprising a shuttlecock positioned in the launch tube to receive a propellant blast force and push the streamer device from the launch tube; and further comprising a fire retardant material positioned in the launch tube between the propellant and the at least one streamer device.

In yet another aspect of the present disclosure, a method for disabling a multi-rotor aircraft comprises: launching at least one streamer device with a plurality of streamer elements from a barrel housing at a predetermined altitude; engaging one or more rotors of the aircraft with at least one streamer element; entangling the streamer element with at least one rotor; and deploying a parachute attached to the streamer device to slow a decent of the aircraft to ground.

In refining aspects, the method further comprises launching a plurality of streamer devices from the barrel housing and entangling rotors of a plurality of multi-rotor aircraft; and transporting the barrel housing to a launch altitude with another multi-rotor aircraft.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus comprising:
   a barrel housing having a plurality of barrels formed around a perimeter thereof;
   a connecting feature formed on a top side thereof; and
   a bomb bay door formed on a bottom side thereof.

2. The apparatus of claim 1, wherein the connecting feature includes a pair of hangers attachable to a host aircraft.

3. The apparatus of claim 1, further comprising a streamer launch tube positioned within at least one of the barrels of the barrel housing.

4. The apparatus of claim 3, further comprising at least one streamer device positioned within the streamer launch tube.

5. The apparatus of claim 4, further comprising at least one streamer element extending from a cord of the streamer device.

6. The apparatus of claim 4, further comprising a propellant disposed within the streamer launch tube.

7. The apparatus of claim 6, further comprising an ignition and control system operable for igniting the propellant and launching the at least one streamer device.

8. The apparatus of claim 4, further comprising a parachute connected to each of the streamer devices.

9. The apparatus of claim 4, wherein a plurality of launch tubes are configured to launch a plurality of streamer devices independently or simultaneously.

10. The apparatus of claim 1, wherein the bomb bay door is configured to eject at least one streamer device therethrough.

11. A drone disabling device comprising:
    a barrel housing having a plurality of barrels positioned intermittently around an outer perimeter of the barrel housing;
    a streamer launch tube positioned in at least one of the plurality of barrels;
    at least one streamer device with a plurality of streamer elements positioned within each streamer launch tube;
    a propellant loaded into the at least one launch tube sufficient to propel the streamer device from the barrel; and
    an ignition system configured to ignite the propellant and launch the streamer device from the barrel.

12. The drone disabling device of claim 11, wherein the barrel housing includes a bomb bay door configured to permit launching of at least one streamer device therethrough.

13. The drone disabling device of claim 11, further comprising a parachute connected to each streamer device.

14. The drone disabling device of claim 13, further comprising a cord connected to the parachute, the plurality of streamer elements and a weight.

15. The drone disabling device of claim 11, wherein the ignition system includes a glow plug to initiate combustion of the propellant.

16. The drone disabling device of claim 11, further comprising a shuttlecock positioned in the launch tube to receive a propellant blast force and push the streamer device from the launch tube.

17. The drone disabling device of claim 11, further comprising a fire retardant material positioned in the launch tube between the propellant and the at least one streamer device.

18. A method for disabling a multi-rotor aircraft comprising:
    transporting a prop fouling array cannon including a barrel housing with a plurality of barrels oriented in different directions to a launch altitude with another multi-rotor aircraft;
    launching at least one streamer device with a plurality of streamer elements from a least one barrel at a predetermined altitude;
    engaging one or more rotors of the aircraft with at least one streamer element;
    entangling the streamer element with at least one rotor; and
    deploying a parachute attached to the streamer device to slow a decent of the aircraft to ground.

19. The method of claim 18, further comprising launching a plurality of streamer devices from the barrel housing and entangling rotors of a plurality of multi-rotor aircraft.

20. A drone disabling device comprising:
    a barrel housing having a plurality of barrels;
    a streamer launch tube positioned in at least one of the plurality of barrels;
    at least one streamer device with a plurality of streamer elements positioned within each streamer launch tube;
    a propellant loaded into the at least one launch tube sufficient to propel the streamer device from the barrel;
    an ignition system configured to ignite the propellant and launch the streamer device from the barrel; and
    wherein the barrel housing includes a bomb bay door configured to permit launching of at least one streamer device therethrough.

* * * * *